Oct. 8, 1935.  J. G. KNIGHT  2,016,284
OUTLET BOX AND THE LIKE
Filed Sept. 12, 1931  2 Sheets-Sheet 1
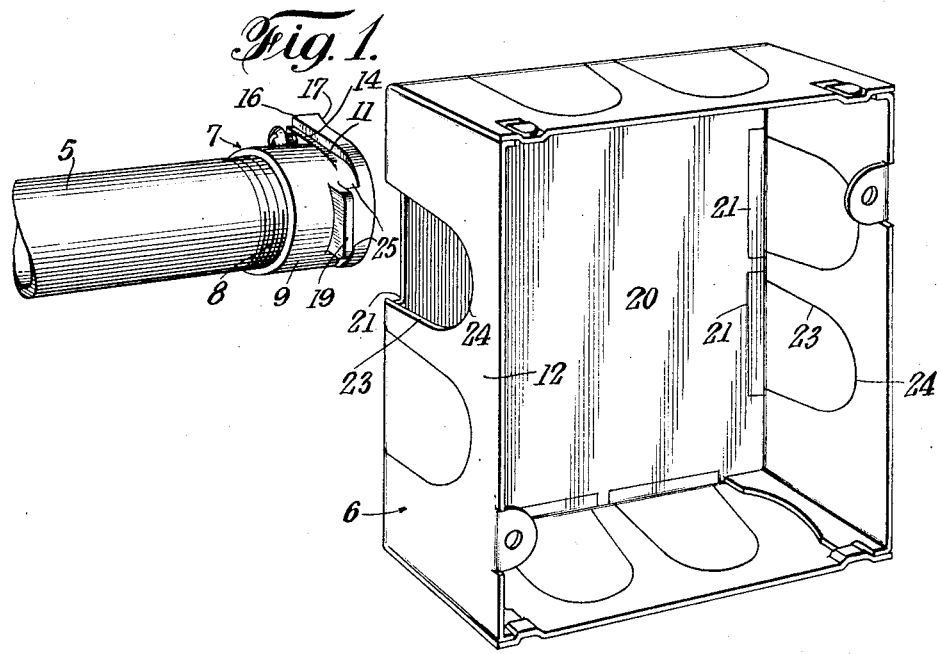
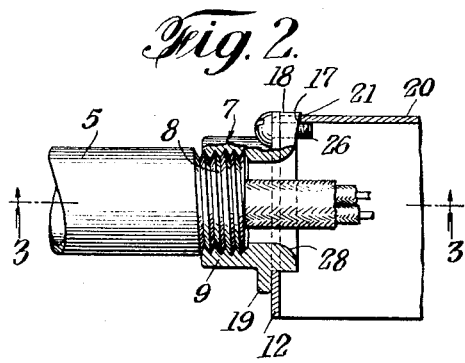
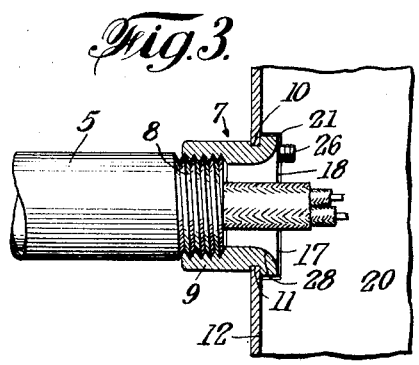
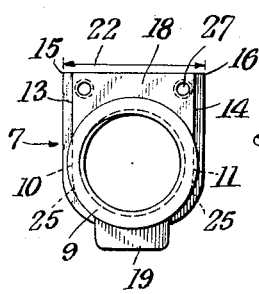
J. G. Knight
INVENTOR
BY
ATTORNEY Oct. 8, 1935.   J. G. KNIGHT   2,016,284
OUTLET BOX AND THE LIKE
Filed Sept. 12, 1931   2 Sheets-Sheet 2
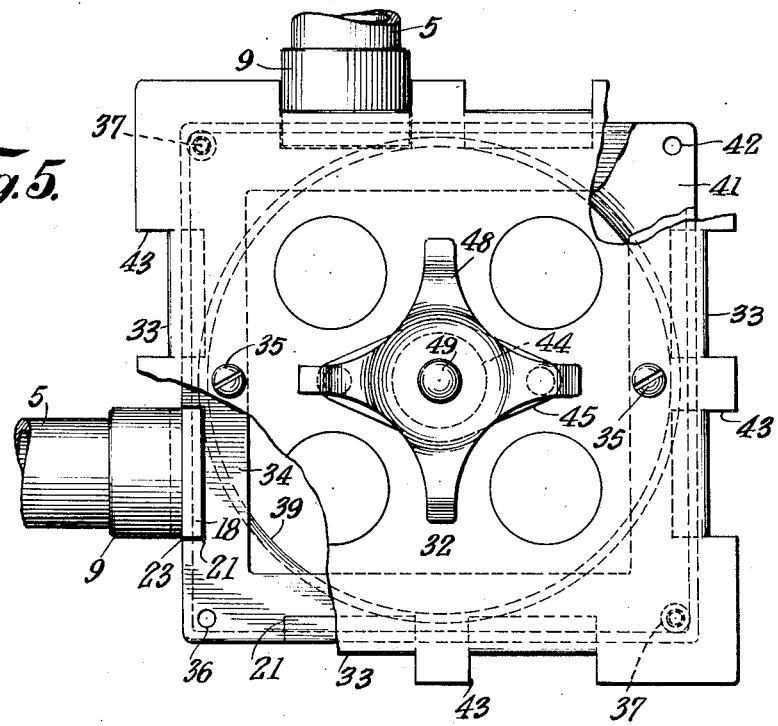
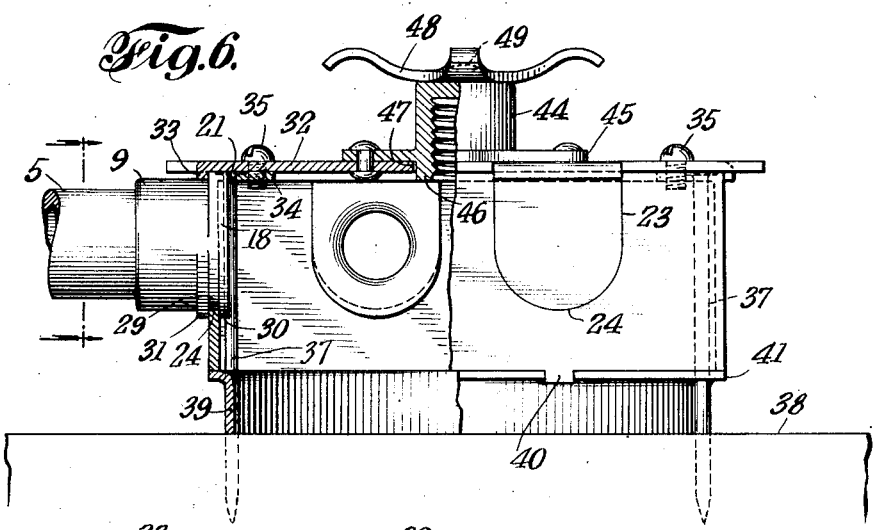
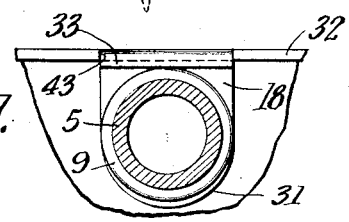
J. G. Knight
INVENTOR Patented Oct. 8, 1935

2,016,284

UNITED STATES PATENT OFFICE 2,016,284

OUTLET BOX AND THE LIKE

Julian Gordon Knight, Brooklyn, N. Y.

Application September 12, 1931, Serial No. 562,463

16 Claims. (Cl. 247—25)

This invention relates to electrical distribution systems involving the use of conduits and outlet boxes, junction boxes, terminal boxes and the like.

The objects of the invention are to facilitate connection of the conduits with the boxes, to enable the ready attachment and detachment of the conduits relative to the boxes, to reduce the connecting means to a single member in place of the various bushings, lock nuts, etc. now required and to actually improve the construction as regards strength, cost, useful space occupied within the box, guidance of the wires, etc.

The objects set forth and others of like nature, are attained by the novel features of construction, combinations and relations of parts hereinafter disclosed and broadly claimed.

The drawings accompanying and forming part of this specification illustrate practical commercial embodiments of the invention but it is to be understood that the structure may be modified as regards such illustration, all within the spirit and broad scope of the invention.

Fig. 1 is a perspective view illustrating a form of square outlet box designed to be embedded in concrete and a cooperating section of conduit as connected according to this invention;

Fig. 2 is a broken sectional view illustrating the parts as connected and a portion of wiring drawn through the mouth of the connection into the box;

Fig. 3 is a similar view taken at right angles to the plane of Fig. 2 substantially on the line 3—3 of Fig. 2;

Fig. 4 is an outer end view of the connecting or coupling fitting;

Fig. 5 is a broken plan view of a modified form of the construction;

Fig. 6 is a broken sectional view illustrating the same as fastened in place on the wooden form for the concrete;

Fig. 7 is a broken part sectional detail as taken on the plane of line 7—7 of Fig. 6.

A special feature of the present invention is that the conduits need not be cut long enough to extend into the box but may instead be cut "short" of the box and so be readily manipulated in various ways before actual attachment to the box.

In the illustrations, portions of ordinary electric conduit are indicated at 5 and a so-called "square" box for concrete work is shown at 6.

As shown particularly in Figs. 2 and 3, the conduit does not extend in through the wall of the box and a special fitting, designated as 7 is used to provide a bridging connection and anchorage between the end of the conduit and the box wall.

This special fitting is suitably attached to the end of the conduit, usually by screwing it on to the pipe threads 8 on the end of the conduit, it having for such purpose in the illustration, the internally screw threaded socket or neck portion 9, the same being long enough and the engagement with the conduit being sufficiently firm to assure a positive, strong connection with the conduit.

The fitting 7, adjacent the end opposite the screw socket is shown as having generally parallel grooves 10, 11 in the opposite sides of the same of sufficient width to receive the box wall 12. The bottoms of these grooves are shown as extended from the general circular portion of the fitting as substantially parallel shoulders 13, 14, Fig. 4 and correspondingly the inner walls of the grooves are shown extended as flanges 15, 16. The opposite faces of such flanges are shown in Fig. 1 as inclined at 17 to serve as wedges, in a manner to be described.

These shoulder and wedge portions last described are all formed on and as part of a closure lug or extension 18 projecting from one side of the fitting. Projecting from the opposite side of the fitting but in a plane in line with the opposite side wall of the grooves, there is provided an abutment lug 19.

The box is specially constructed to take this particular form of fitting by having the back wall 20 of the same notched or cut out at 21, substantially parallel to the inner face of the side wall a length equal to or slightly greater than the crosswise dimension 22 of the closure piece 18, so as in fact to receive this piece as shown in Fig. 3.

Extending from the slots 21 in the back wall, down into the side walls are the cutouts 23 of lesser width and designed to receive the grooved and shouldered portions 10, 11, 13, 14 of the fitting, the side wall cutouts being rounded as at 24 to fit the rounded neck portions 25 of the connector.

Usually the combination cutouts in the back and the side walls of the box are formed as "knockouts" which can be readily displaced wherever the conduit is to be connected with the box.

From Fig. 1 it will be apparent that with the coupling or fitting secured on the end of the conduit, the desired knockout having been displaced, it is only necessary to slip the notched or grooved portion of the fitting down into the notch 23 in the side wall of the box, flanges 15, 16 of the fitting, in this movement passing down through the communicating notch 21 in the back of the box and thereby entering inside the box. As the fitting reaches its seat in the side wall notch, the inclined outer face portion 17 of the closure lug makes a wedging fit in the back wall notch 21, as in Figs. 2 and 3 to form a tight frictional joint. To provide a positive interlock, however, screws 26 may be used, threaded in screw seats 27 in the closure portion 18 and extending from the outside through such closure portion into engagement beneath the back wall of the box. One such screw will amply suffice to lock the fitting in place but two screw seats 27 are shown provided at opposite edges of the fitting so as to enable use of two such screws or one locking screw at the most convenient or accessible corner of the fitting.

As the fitting has portions engaging both inside and outside the box wall, it is firmly held to the box and the box is actually reinforced by the fitting. The fitting need extend inside the box only sufficiently to gain a hold against the inside face of the box and hence need not project into the box to any appreciable extent, thus leaving the entire interior of the box clear and free for wiring purposes. The mouth of the fitting where it opens into the box may be rounded and flared open as indicated at 28 to provide smooth non-cutting supporting and guiding surfaces for the wire.

To uncouple the conduit from the box it is merely necessary to turn the screw or screws 26 back far enough for the inner ends of the same to clear the edge of the back slot 21 in the box whereupon the fitting will slide back out of the slot 23 in the side wall of the box. If desired, these side slots may be formed with slightly convergent sides, as appears most plainly at the bottom of Fig. 1 so that the coupling member will have a wedge fit in the side of the box.

The invention has many advantages. The fact that it is unnecessary to make the conduits long enough to extend into the boxes is important from many practical viewpoints, enabling as it does relative manipulation of box and conduit not attainable heretofore and permitting boxes to be readily inserted in a line of conduit or at the end of a line of conduit, with comparatively slight labor and expense.

In the form of the invention illustrated in Figs. 5, 6 and 7, the notches 21 and 23 in the back and the side of the box are of the same width and only the lower or innermost portion of the fitting is grooved as indicated at 29 to interlock over the rounded edge portion 24 of the side wall slot 23. This structure provides shoulders 30, 31, engaging inside and outside faces of the box and the fitting is held in this interlocked relation in this particular case by a removable back cover 32, overstanding the closure lug portion 18 of the fitting and confining the same as shown in Fig. 6, between the back edge of the slot 21 and an abutment shoulder 33 struck down from the cover plate. Secured in such fashion, the fitting is held against movement in any direction.

In this second form of the invention, the back of the box is open, except for a relatively narrow flange 34 struck inward from the side wall portion of the box. In this flange, the slots or notches 21 are formed and the same is utilized to provide seats for receiving the screws 35, which fasten the back cover plate in place. This flange is also shown as perforated at 36 in the corners of the box to receive nails 37 for fastening the box down on the wooden form 38.

In this particular illustration, a circular cuff or extension 39 is shown as fastened to the mouth of the box as by welding or rivet lugs as indicated at 40 and the base flange 41 of this extension, by which the same is attached to the box body is indicated as perforated in the corners at 42, in line with the nail holes 36 in the back flange to guide the anchoring nails straight into the form and to give the nails purchase on the box at both the front and the back of the box. By such means, the box is so firmly anchored on the form that the knockouts can be readily dislodged after the box is in position.

The shoulders 33 carried by the back cover are shown as lugs struck down from notched portions 43 in the edges of the cover and bent under sufficiently to interlock firmly over the closure portion 18 of the fitting.

In Fig. 6, a hollow fixture stud 44 is shown of the type covered in Patent 1,762,995, internally threaded to secure the fixture supporting member and having a flange 45 by which the same is riveted or otherwise made a substantially integral part of the box top. Added length for the supporting screw threads is however provided in this particular construction by extending an internally screw threaded hub portion 46, below the mounting flange 45 and actually entering down through the opening 47 in the box top. This construction centers the fixture stud on the top or back wall and braces the stud laterally.

To gain additional anchorage for the fixture, the hollow fixture stud may be enlarged at the top, for instance, by having a star shaped anchorage piece 48, riveted at 49 over the closed upper end of the stud. The outstanding arms of this anchorage piece and the projecting edges of the cover plate 32 by embedment in the concrete provide ample support for the fixture, independent of the conduit system.

While the connection between the conduit and box wall has been shown as effected by means of a coupling sleeve grooved or shouldered to interlock with the box wall, it is possible that the grooved or shouldered portion for interlocking with the box wall may be formed as an integral part of the conduit, for instance, by turning a groove or part-groove direct in the outer surface of the pipe by means of a special cutting tool.

As the invention is of broad scope, it should be understood that the terms employed herein have been used in a descriptive rather than in a limiting sense, except possibly for limitations as may be imposed by the state of the prior art.

What is claimed is:

1. In combination with an outlet box or the like having angularly related walls with coextensive notches therein, the notch in one of said walls having convergent sides, a conduit attaching fitting grooved on opposite sides to slidingly engage and frictionally interlock in said convergent sided notch and having an inclined portion entering through the other notch to wedge the fitting against an inner face of the box.

2. As a new article of manufacture, an outlet box or the like having angularly related back and side walls with a knockout located partly in the back wall and partly in the side wall and the portion of the knockout in one wall being narrower than the portion of the knockout in the other wall.

3. As a new article of manufacture, an outlet box or the like having angularly related back and side walls with a knockout having coextensive portions in the back and side walls, that portion in the side wall being of narrower width but greater length than that portion in the back wall.

4. A box of the character disclosed, provided with angularly related walls and having coextensive slots in said walls, an end fitting for a conduit adapted to enter through one of said slots into seated relation in the other of said coextensive slots and means for securing said fitting interlocked in such relation to the box including a cover member engageable with the box in position overstanding said fitting and having a lug for interlocking engagement with the fitting.

5. An outlet box or the like, open at the back and having slots in the side walls of the same extending from the open back portion, conduits carrying shouldered portions entered in said slots and interlockingly engaged with portions of the side wall of the box and a back cover removably fastened in position securing the device in such interlocked relation.

6. An outlet box or the like, having angularly related back and side walls provided with coextensive notches therein, the notch in the side wall being of less width than the connected notch in the back wall and a conduit holding fitting having a portion of greater width than the notch in the side wall but of less width than the notch in the back wall and thereby adapted to be entered through said back wall notch into position in the side wall notch and behind said side wall, inside the box.

7. An outlet box or the like, having angularly related back and side walls provided with coextensive notches therein, the notch in the side wall being of less width than the connected notch in the back wall and a conduit holding fitting having a portion of greater width than the notch in the side wall but of less width than the notch in the back wall, thereby adapted to be entered through said back wall notch into position in the side wall notch and behind said side wall, inside the box and a fastening screw having an operating head exposed outside the box and extending through said fitting into engagement with the inner face of the back wall adjoining the notch therein.

8. An outlet box or the like, having angularly related back and side walls provided with coextensive notches, one of less width than the other and a conduit holding fitting having a portion of greater width than the narrower notch, but of less width than the wider notch and thereby adapted to be entered through said wider notch into position in the narrower notch behind the wall in which said narrower notch is formed.

9. An outlet box or the like, having angularly related back and side walls provided with coextensive notches, one of less width than the other and a conduit having a member at the end of the same of greater width than the narrower notch, but of less width than the wider notch, so as to enter through said wider notch into position in the narrower notch behind the wall in which said narrower notch is formed.

10. An outlet box or the like, having angularly related back and side walls provided with coextensive notches, one of less width than the other, a conduit having a member at the end of the same of greater width than the narrower notch, but of less width than the wider notch, so as to enter through said wider notch into position in the narrower notch behind the wall in which said narrower notch is formed and screw means accessible at the outside of the box for securing the conduit in the position described.

11. In combination with an outlet box or the like, said box having communicating openings therethrough and one of said openings being of greater width than the other, a conduit holding fitting having a portion of less width than the wider opening but of greater width than the communicating narrower opening, and whereby said conduit fitting may be entered through said wider opening and be shifted into position behind that portion of the box wall containing the narrower opening and externally operable screw means for securing said conduit fitting in such shifted position interlocked behind the box wall.

12. In combination with an outlet box or the like, said box having openings therethrough and forming one a continuation of the other, and one of such coextensive openings being of lesser width than the other, a conduit having an enlargement at the end of the same of greater width than the narrower opening, but of lesser width than the wider opening, and thereby adapted to be entered through said wider opening into position behind that part of the box wall containing the lesser width opening and screw means operable at the outside of the box for securing the conduit thus interlocked with the box wall.

13. In combination with an outlet box having coextensive slots in angularly related back and side walls of the same and the slot in one wall of greater width than the slot in the other wall, a conduit holding fitting having a slot closing portion of greater size than the narrower slot and of lesser size than the wider slot to enable shifting of the same through the wider slot into position inside the box behind the wall containing the narrower slot and said closure portion having wedging surfaces cooperating with edge portions of the slots to automatically tighten the fitting as it is forced through one slot into position behind the other slot.

14. In combination with an outlet box having coextensive slots in angularly related back and side walls of the same and the slot in one wall of greater width than the slot in the other wall, a conduit holding fitting having a slot closing portion of greater size than the narrower slot and of lesser size than the wider slot to enable shifting of the same through the wider slot into position inside the box behind the wall containing the narrower slot, said closure portion having wedging surfaces cooperating with edge portions of the slots to automatically tighten the fitting as it is forced through one slot into position behind the other slot, said wedging surfaces including an incline on the back of the closure portion to engage the back edge of the wider slot to force the fitting toward the wall having the narrower slot therein.

15. An outlet box or the like, having a removable back wall and a side wall slotted inward from said removable back wall, a conduit holding fitting entered from the back into said slot and overlapping the side wall at the inside of the box about the slot therein and means securing the back wall in position overstanding said fitting and thereby removably confining the same to the side wall of the box.

16. In combination, an outlet box or the like, having adjoining angularly related walls with coextensive openings therethrough, the opening in one wall being of lesser width than the opening in the other wall, a conduit having an enlargement at the end of the same of greater width than the narrower opening, but of lesser width than the wider opening and thereby adapted to be entered through the wider opening in one wall into position behind the wall containing the narrower opening and a screw carried by the conduit and extensible longitudinally of the conduit into engagement with the inner face of the wall having the greater width opening.

JULIAN GORDON KNIGHT.